United States Patent Office 3,341,493
Patented Sept. 12, 1967

3,341,493
ETHYLENICALLY UNSATURATED DERIVATIVES
OF 2,4-DIHYDROXYBENZOPHENONE
Albert I. Goldberg, Berkeley Heights, N.J., and Joseph Fertig and Martin Skoultchi, New York, N.Y., assignors to National Starch and Chemical Corporation, New York, N.Y., a corporation of Delaware
No Drawing. Filed Sept. 17, 1962, Ser. No. 224,247
The portion of the term of the patent subsequent to Dec. 22, 1981, has been disclaimed
16 Claims. (Cl. 260—47)

This invention relates to the preparation of ethylenically unsaturated derivatives of 2,4-dihydroxybenzophenone, the novel derivatives thus prepared, as well as to the copolymers derived therefrom.

British Patent No. 885,986, relates to the preparation of the ethylenically unsaturated acryloxy and methacryloxy derivatives of 2,4-dihydroxybenzophenone, i.e.

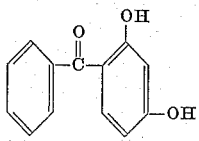

by means of the reaction of the latter with either acrylyl or methacrylyl chloride. However, there are a number of factors which would appear to preclude any widespread commercial utilization of this particular synthetic route. Thus, for example, the acrylyl and methacrylyl chlorides are troublesome to prepare and are, accordingly, rather expensive and difficult to obtain. Moreover, the handling of these reagents presents many problems as they display a pronounced tendency towards spontaneous polymerization. The actual reaction between these acrylyl or methacrylyl chlorides and the 2,4-dihydroxybenzophenone is itself somewhat tedious inasmuch as it results in the evolution of hydrochloric acid which must be removed from the system by the initial presence, therein, of a tertiary amine such as pyridine. The resulting tertiary amine-hydrochloric acid adduct must then in turn, be separated from the desired ethylenically unsaturated 2,4-dihydroxybenzophenone reaction product by employing a time consuming combination of extraction and distillation procedures.

In our copending applications, Ser. Nos. 202,983, filed June 18, 1962, which issued Dec. 12, 1964, as U.S. Patent 3,162,676, and 202,984, filed June 18, 1962, now abandoned and presently refiled as continuation-in-part bearing Ser. No. 405,864, on Oct. 22, 1964, which issued on Aug. 24, 1965, as U.S. Patent 3,202,716, both of the latter patents being assigned to the assignee of the subject application, there are disclosed two novel classes of vinyl monomers comprising, respectively, the beta-hydroxypropyl acrylate and methacrylate, and the (3-allyloxy-2-hydroxy)propyl and (2 - hydroxy)butenyl-1 ethers of 2,4-dihydroxybenzophenone. Although the latter derivatives are prepared by means of a process which is far less complex than that of the above described British patent, the compounds create problems under certain conditions. For example, they may tend to homopolymerize preferentially when the beta-hydroxypropyl acrylate or methacrylate ethers are utilized as comonomers, and difficulties are also encountered when attempts are made to prepare homogeneous copolymers with monomers of lesser reactivity, such as vinyl chloride and vinyl acetate. The ease with which these benzophenone derivatives tend to polymerize also presents a problem with respect to their handling and storage. Thus, for example, great care must be exercised in order to distill these compounds without initiating their spontaneous polymerization.

As for the (3-allyloxy-2-hydroxy)propyl and the (2-hydroxy)butenyl-1 ethers of 2,4-dihydroxybenzophenone, these derivatives, in contrast to the behavior of the beta-hydroxypropyl acrylate and methacrylate ethers, are somewhat difficult to homopolymerize. Moreover, they are also, in fact rather difficult to copolymerize under the usual polymerization conditions.

It is thus the fundamental object of this invention to provide a novel class of ethylenically unsaturated derivatives of 2,4-dihydroxybenzophenone, said derivatives being capable of undergoing vinyl type polymerization reaction in the presence of other vinyl type comonomers.

A further object of this invention involves the preparation of polymerizable derivatives of 2,4-dihydroxybenzophenone and their subsequent incorporation into a wide variety of copolymers so as to provide such copolymers with improved heat stability and, more particularly, with improved light stability.

A still further object of our invention is to provide a class of monomeric 2,4-dihydroxybenzophenone derivatives which have little or no tendency to homopolymerize and are readily and homogeneously copolymerized with a variety of comonomers, including those having a low degree of reactivity, such as vinyl chloride and vinyl acetate.

The novel compositions of our invention are the ethylenically unsaturated derivatives of 2,4-dihydroxybenzophenone corresponding to the representation:

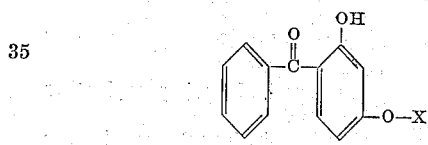

wherein X is an ethylenically unsaturated radical selected from among the group consisting of beta-hydroxypropylene crotonate, i.e

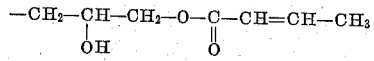

beta-hydroxypropylene alkyl maleate, i.e.

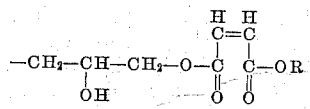

beta-hydroxypropylene alkyl fumarate, i.e.

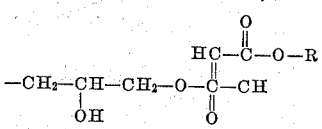

beta-hydroxypropylene alkyl itaconate, i.e.

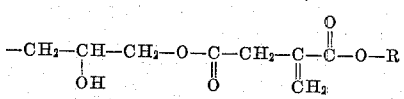

and, beta-hydroxypropylene alkyl citraconate, i.e.

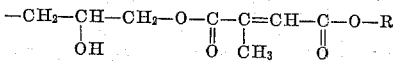

radicals wherein R in each of the latter formulae represents an alkyl radical containing no more than 4 carbon atoms selected from among the group consisting of methyl, ethyl, n-propyl, isopropyl, n-butyl, isobutyl, secondary butyl, and tertiary butyl radicals.

As represenative of the 2,4-dihydroxybenzophenone derivatives of our invention, one may list the 4-(crotoxyloxy beta-hydroxy) propyl ether of 2,4-dihydroxybenzophenone,
the 4-(methyl maleyloxy beta-hydroxy) propyl ether of 2,4-dihydroxybenzophenone,
the 4-(ethyl maleyloxy beta-hydroxy) propyl ether of 2,4-dihydroxybenzophenone,
the 4-(n-propyl maleyloxy beta-hydroxy) propyl ether of 2,4-dihydroxybenzophenone,
the 4-(iso-propyl maleyloxy beta-hydroxy) propyl ether of 2,4-dihydroxybenzophenone,
the 4-(n-butyl maleyloxy beta-hydroxy) propyl ether of 2,4-dihydroxybenzophenone,
the 4-(isobutyl maleyloxy beta-hydroxy) propyl ether of 2,4-dihydroxybenzophenone,
the 4-(secondary butyl maleyloxy beta-hydroxy) propyl ether of 2,4-dihydroxybenzophenone,
the 4-(tertiary butyl maleyloxy beta-hydroxy) propyl ether of 2,4-dihydroxybenzophenone,
the 4-(methyl fumaryloxy beta-hydroxy) propyl ether of 2,4-dihydroxybenzophenone,
the 4-(ethyl fumaryloxy beta-hydroxy) propyl ether of 2,4-dihydroxybenzophenone,
the 4-(n-propyl fumaryloxy beta-hydroxy) propyl ether of 2,4-dihydroxybenzophenone,
the 4-(isopropyl fumaryloxy beta-hydroxy) propyl ether of 2,4-dihydroxybenzophenone,
the 4-(n-butyl fumaryloxy beta-hydroxy) propyl ether of 2,4-dihydroxybenzophenone,
the 4-(isobutyl fumaryloxy beta-hydroxy) propyl ether of 2,4-dihydroxybenzophenone,
the 4-(secondary butyl fumaryloxy beta-hydroxy) propyl ether of 2,4-dihydroxybenzophenone,
the 4-(tertiary butyl fumaryloxy beta-hydroxy) propyl ether of 2,4-dihydroxybenzophenone,
the 4-(methyl itaconyloxy beta-hydroxy) propyl ether of 2,4-dihydroxybenzophenone,
the 4-(ethyl itaconyloxy beta-hydroxy) propyl ether of 2,4-dihydroxybenzophenone,
the 4-(n-propyl itaconyloxy beta-hydroxy) propyl ether of 2,4-dihydroxybenzophenone,
the 4-(isopropyl itaconyloxy beta-hydroxy) propyl ether of 2,4-dihydroxybenzophenone,
the 4-(n-butyl itaconyloxy beta-hydroxy) propyl ether of 2,4-dihydroxybenzophenone,
the 4-(isobutyl itaconyloxy beta-hydroxy) propyl ether of 2,4-dihydroxybenzophenone,
the 4-(secondary butyl itaconyloxy beta-hydroxy) propyl ether of 2,4-dihydroxybenzophenone,
the 4-(tertiary butyl itaconyloxy beta-hydroxy) propyl ether of 2,4-dihydroxybenzophenone,
the 4-(methyl citraconyloxy beta-hydroxy) propyl ether of 2,4-dihydroxybenzophenone,
the 4-(ethyl citraconyloxy beta-hydroxy) propyl ether of 2,4-dihydroxybenzophenone,
the 4-(n-propyl citraconyloxy beta-hydroxy) propyl ether of 2,4-dihydroxybenzophenone,
the 4-(isopropyl citraconyloxy beta-hydroxy) propyl ether of 2,4-dihydroxybenzophenone,
the 4-(n-butyl citraconyloxy beta-hydroxy) propyl ether of 2,4-dihydroxybenzophenone,
the 4-(isobutyl citraconyloxy beta-hydroxy) propyl ether of 2,4-dihydroxybenzophenone,
the 4-(secondary butyl citraconyloxy beta-hydroxy) propyl ether of 2,4-dihydroxybenzophenone, and,
the 4-(tertiary butyl citraconyloxy beta-hydroxy) propyl ether of 2,4-dihydroxybenzophenone.

Thus, it is to be seen that the derivatives of our invention may be described as ethylenically unsaturated derivatives of 2,4-dihydroxybenzophenone; or, more specifically, as the beta-hydroxypropylene crotonate, the beta-hydroxypropylene alkyl maleate, the beta-hydroxypropylene alkyl fumarate, the beta-hydroxypropyl alkyl itaconate, and the beta-hydroxypropylene alkyl citraconate ethers of 2,4-dihydroxybenzophenone wherein the various beta-hydroxypropylene ether groups are substituted upon the #4 position of the benzophenone nucleus.

All of the above listed compounds, as well as any others which may correspond to the above definition, are materials which are capable of readily undergoing vinyl type polymerization reactions. They are thus useful for the preparation of copolymers with a wide variety of other vinyl type monomers. These copolymers are especially outstanding in regard to their superior light stability. This improved stability is imparted to these copolymers as a result of the presence therein of the 2,4-dihydroxybenzophenone moiety which is permanently bound into and inherently part of the resulting copolymer molecule as a result of the incorporation therein of the ethylenically unsaturated 2,4-dihydroxybenzophenone derivatives of our invention.

In brief, the synthesis of our novel derivatives is accomplished by the catalyzed reaction of 2,4-dihydroxybenzophenone together with a glycidyl ester of an ethylenically unsaturated carboxylic acid containing at least 4 carbon atoms selected from among the group consisting of crotonic acid and the alkyl half esters of maleic, fumaric, itaconic and citraconic acids, the alkyl radical of said half esters being a radical which contains no more than 4 carbon atoms and which is selected from among the group consisting of methyl, ethyl, n-propyl, isopropyl, n-butyl, isobutyl, secondary butyl, and tertiary butyl radicals, i.e. the $C_1$–$C_4$ alkyl radicals.

It is to be noted that glycidyl crotonate as well as the glycidyl esters of the $C_1$–$C_4$ alkyl half esters of maleic, fumaric, itaconic, and citraconic acids will all hereinafter be considered, within this description of the invention as glycidyl esters of ethylenically unsaturated carboxylic acids inasmuch as the latter class of reagents react with 2,4-dihydroxybenzophenone in a manner which is in all respects fully equivalent to that observed during the reaction of the 2,4-dihydroxybenzophenone with glycidyl crotonate. Moreover, for purposes of brevity, these glycidyl esters of ethylenically unsaturated carboxylic acids will be, hereinafter, collectively referred to as "the glycidyl esters."

The preparation of these various glycidyl esters may be readily accomplished by means of procedures well known to those skilled in the art which are not, of course, being claimed as a novel aspect of the process of this invention. Thus, glycidyl crotonate is prepared by the reaction of epichlorohydrin with potassium crotonate. The glycidyl esters of the $C_1$–$C_4$ alkyl half esters of maleic, itaconic and citraconic acids are obtained by first preparing the respective alkyl half esters by means of the reaction between the acid anhydride and a $C_1$–$C_4$ alcohol. The resulting half ester is converted to its sodium salt by reaction with sodium bicarbonate and the sodium salt, in turn, is reacted with epichlorohydrin to produce the desired glycidyl ester. As for the glycidyl alkyl fumarates, these are most conveniently prepared by isomerizing a maleate half ester to its isomeric fumarate half ester by gently heating the former in the presence of catalytic amounts of iodine. The fumarate half ester is then converted to its sodium salt which is next reacted with epichlorohydrin in a manner comparable to that described for the preparation of the glycidyl esters of the alkyl half esters of maleic, itaconic, and citraconic acids.

In conducting the reaction which leads to the synthesis of our novel derivatives, the glycidyl ester, in a cocentration amounting to a slight stoichiometric excess in the order of about 10 to 20% over the subsequently added 2,4-dihydroxybenzophenone, is first ordinarily admixed with the selected catalyst. The latter may be chosen from among any member of the group consisting of the alkali metal hydroxides, such as sodium hydroxide or potassium hydroxide; the salts of the alkali metals, such as sodium bicarbonate or sodium chloride; and, the quaternary ammonium halides, such as tetramethyl ammonium chloride or tetrabutylammonium iodide. These catalysts should be present in concentrations of about 0.1 to 5.0%, as based upon the weight of the glycidyl ester.

Following the initial preparation of the mixture comprising the catalyst and the glycidyl ester, the 2,4-dihydroxybenzophenone is thereupon added with continued agitation. However, it should be emphasized that the use of this particular sequence is not critical to the process of our invention and may be altered by the practitioner to suit his particular needs. It is, in fact, possible to admix the reactants and the catalyst in any desired sequence. In any event, following the complete admixture of the 2,4-dihydroxybenzophenone with the catalyst and the glycidyl ester, agitation is continued while the resulting reaction mixture is maintained at a temperature in the range of about 50 to 100° C., and preferably at about 80 to 90° C., for periods of about 6 to 14 hours. Under these conditions, the reaction between the 2,4-dihydroxybenzophenone and the glycidyl ester, will ordinarily proceed at a conversion in the range of about 80 to 95%.

In general, the preparation of the derivatives of our invention may be conducted at any temperature which will be high enough so as to result in an adequate reaction rate. However, inasmuch as these derivatives display very little tendency to homopolymerize, they may if desired be prepared at rather high temperatures without any danger of their spontaneous polymerization. In addition, the length of the reaction period will depend, for the most part, upon the specific glycidyl ester which is being utilized. Thus, it is a matter of ordinary preparative experience on the part of the practitioner to determine the precise combination of time and temperature which will be best suited for his synthesis of any of the novel benzophenone derivatives coming within the scope of our invention, since the examples herein are merely illustrative.

Upon the completion of the reaction and with subsequent cooling of the reaction vessel to room temperature, the resulting products will ordinarily be in the form of viscous oils. For most purposes, including any subsequent polymerization reactions, this crude beta-hydroxypropyl ether of 2,4-dihydroxybenzophenone can then be used without any further purification being necessary. However, where desired, the relatively small amount of unreacted 2,4-dihydroxybenzophenone may be removed. Thus, such means as chromatographic separation techniques, as for example with the use of a silica gel column, have been found to yield a product which, by means of a saponification equivalent analysis, will indicate a purity of 100%, by weight. Other separation techniques, such as aqueous alkali or organic solvent extraction procedures, may also be used where so desired by the practitioner.

It is also possible to prepare the novel derivatives of our invention by reaction in an organic solvent medium. Under these conditions, the 2,4-dihydroxybenzophenone, the catalyst, and the glycidyl ester may all be dissolved in a nonreactive polar solvent such as acetone, methyl ethyl ketone, butyl acetate, tetrahydrofuran, dimethylformamide or dimethylsulfoxide. The resulting derivative would then be recovered by distilling off the solvent whereupon the crude product could, again, be purified by means of the above noted techniques.

Of interest to the practitioner is the fact that the previously noted resistance to homopolymerization, on the part of our novel derivatives, greatly facilitate their handling and storage. Thus, they may be subjected to various operations, such for example as distillation, and may also be stored for prolonged periods without any danger of their spontaneous polymerization.

In utilizing our ethylenically unsaturated benzophenone derivatives in the preparation of copolymers, there may be employed any of the usual vinyl polymerization methods which are well known to those skilled in the art and which is particularly suited for the copolymer whose preparation is desired. Thus, such copolymers may be prepared by means of free radical initiated processes utilizing bulk, suspension, solution, or emulsion polymerization techniques; or, they may be prepared by ionic catalysis or by means of stereospecific catalysts such as those of the type developed by Ziegler.

The comonomers which may be utilized together with the above described ethylenically unsaturated 2,4-dihydroxybenzophenone derivatives for the preparation of the ultra-violet stable copolymers of our invention can be any ethylenically unsaturated monomer such, for example, as styrene; alpha-methyl styrene; the acrylic and methacrylic acid esters of aliphatic alcohols such as methyl, ethyl, propyl, butyl, isobutyl, amyl, hexyl, 2-ethyl hexyl, octyl, lauryl and stearyl alcohols; acrylic acid, methacrylic acid; isoprene; acrylamide; acrylonitrile; methacrylonitrile; butadiene; vinyl propionate; dibutyl fumarate; dibutyl maleate; vinylidene chloride; vinyl chloride; vinyl acetate, ethylene; and, propylene, etc. Any of these monomers may be used either alone or in combination with one another together with one or more of the benzophenone containing monomers.

Among the copolymers of our invention which may be of particular interest to the practitioner are the copolymers of the beta-hydroxypropylene alkyl itaconates with either vinylidene chloride, styrene or the alkyl methacrylates as well as the copolymers of the beta-hydroxypropylene crotonate derivative or of the beta-hydroxypropylene alkyl fumarate or alkyl maleate derivatives with either vinyl chloride or vinyl acetate.

In order to effectively withstand the effects of ultra-violet radiation, the copolymers of our invention should contain at least 0.1% by weight, of these ethylenically unsaturated 2,4-dihydroxybenzophenone derivatives. As for the maximum concentration, this will depend, of course, upon the particular comonomer as well as on the specific end use application of the resulting copolymer. However, in most cases a concentration of about 5.0%, by weight, will be fully adequate with economically effective results being obtained with a concentration in the range of about 2.0%. Larger quantities of up to about 10–20% may be used in order to obtain copolymers which are especially suited for use as coatings.

In any event, the copolymers of our invention, whether prepared by means of bulk, suspension, solution, or emulsion polymerization techniques or by other means, are all characterized by their improved stability to light. This improved stability is fully equivalent, and in many cases superior, to the results obtained when extraneous ultra-violet light absorbers are added to the comparable polymers which do not contain these 2,4-dihydroxybenzophenone derivatives. Moreover, all of the deficiencies which are inherent in the use of these extraneous stabilizers are completely avoided with the products of our invention. Thus, our novel polymeric compositions offer protection against the degradative effects of ultra-violet radiation while eliminating problems of volatility, toxicity and migration.

It may be pointed out at this time, that although the process of our invention has been limited to the preparation of the monomeric derivatives, and to the copolymers containing the latter, which result from the reaction between 2,4-dihydroxybenzophenone with either the glycidyl ester of crotonic acid or the glycidyl ester of a $C_1$–$C_4$ alkyl half ester of maleic, fumaric, itaconic, or citraconic acid, it should be noted that either 2,2'4-trihydroxybenzophenone or 2,2'4, 4'-tetrahydroxybenzophenone are also applicable for reactions of this type.

The following examples will further illustrate the embodiment of this invention. In these examples, all parts given are by weight unless otherwise noted.

EXAMPLE I

This example illustrates the preparation of the 4-(crotonyloxy beta-hydroxy) propyl ether of 2,4-dihydroxybenzophenone, i.e.

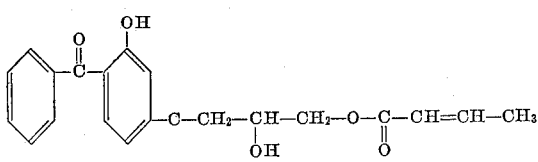

by means of the process of our invention.

An agitated mixture of 15.0 parts of glycidyl crotonate, 21.4 parts of 2,4-dihydroxybenzophenone and 0.4 part of tetramethylammonium chloride was heated to a temperature in the range of 90° C. and maintained at this temperature for a period of 8 hours. Upon being cooled to 20° C., the resulting reaction product, which was in the form of a viscous oil, was removed and subjected to a base titration. The latter analysis revealed that there was about 2% of unreacted 2,4-dihydroxybenzophenone present within this reaction product which thereby indicated a conversion of 96% or a yield of about 34 parts of the 4-(crotonyloxy beta-hydroxy) propyl ether of 2,4-dihydroxybenzophenone.

EXAMPLE II

This example illustrates the preparation of the 4-(methyl maleyloxy beta-hydroxy) propyl ether of 2,4-dihydroxybenzophenone, i.e.

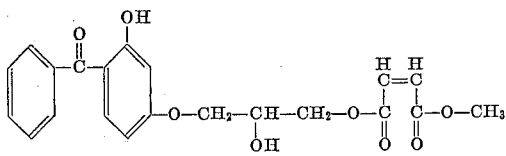

by means of the process of our invention.

An agitated mixture of 21.0 parts of glycidyl methyl maleate, 21.4 parts of 2,4-dihydroxybenzophenone and 0.3 part of sodium hydroxide was heated to a temperature in the range of 90° C. and maintained at this temperature for a period of 12 hours. Upon being cooled to 20° C., the resulting reaction product, which was in the form of a viscous oil, was removed and subjected to a base titration. The latter analysis revealed that there was about 1.5% of unreacted 2,4-dihydroxybenzophenone present within this reaction product which thereby indicated a conversion of 97% or a yield of about 40 parts of the 4-(methyl maleyloxy beta-hydroxy)-propyl ether of 2,4-dihydroxybenzophenone.

Following the above described procedure, wherein the appropriate glycidyl alkyl maleates were in this case substituted for glycidyl methyl maleate, we prepared the following ethylenically unsaturated derivatives of 2,4-dihydroxybenzophenone in yields which were comparable to that noted for the 4-(methyl maleyloxy beta-hydroxy) propyl ether:

the 4-(ethyl maleyloxy beta-hydroxy)propyl ether of 2,4-dihydroxybenzophenone,
the 4-(n-propyl maleyloxy beta-hydroxy)propyl ether of 2,4-dihydroxybenzophenone,
the 4-(isopropyl maleyloxy beta-hydroxy) propyl ether of 2,4-dihydroxybenzophenone,
the 4-(n-butyl maleyloxy beta-hydroxy)propyl ether of 2,4-dihydroxybenzophenone,
the 4-(isobutyl maleyloxy beta-hydroxy)propyl ether of 2,4-dihydroxybenzophenone,
the 4-(secondary butyl maleyloxy beta-hydroxy)propyl ether of 2,4-dihydroxybenzophenone, and,
the 4-(tertiary butyl maleyloxy beta-hydroxy)propyl ether of 2,4-dihydroxybenzophenone.

EXAMPLE III

This example illustrates the preparation of the 4-(ethyl fumaryloxy beta-hydroxy)propyl ether of 2,4-dihydroxybenzophenone, i.e.

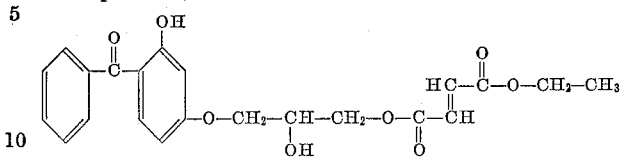

by means of the process of our invention.

An agitated mixture of 22.0 parts of glycidyl ethyl fumarate, 21.4 parts of 2,4-dihydroxybenzophenone and 0.5 part of tetrabutylammonium iodide was heated to a temperature in the range of 90° C. and maintained at this temperature for a period of 12 hours. Upon being cooled to 20° C., the resulting reaction product, which was in the form of a viscous oil, was removed and subjected to a base titration. The latter analysis revealed that there was about 1.8% of unreacted 2,4-dihydroxybenzophenone present within this reaction product which thereby indicated a conversion of 96% or a yield of about 39.8 parts of the 4-(ethyl fumaryloxy beta-hydroxy) propyl ether of 2,4-dihydroxybenzophenone.

EXAMPLE IV

This example illustrates the preparation of the 4-(ethyl itaconyloxy beta-hydroxy) propyl ether of 2,4-dihydroxybenzophenone, i.e.

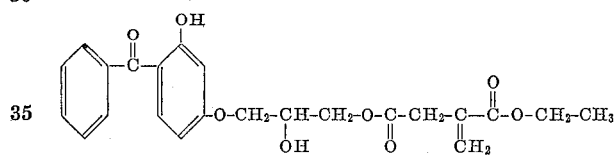

by means of the process of our invention.

An agitated mixture of 23.5 parts of glycidyl ethyl itaconate, 21.4 parts of 2,4-dihydroxybenzophenone and 0.5 part of tetramethylammonium chloride was heated to a temperature of 90° C. and maintained at this temperature for a period of 12 hours. Upon being cooled to 20° C., the resulting reaction product, which was in the form of a viscous oil, was removed and subjected to a base titration. The latter analysis revealed that there was about 2.6% of unreacted 2,4-dihydroxybenzophenone present within this reaction product which thereby indicated a conversion of 94.5% or a yield of about 40.3 parts of the 4-(ethyl itaconyloxy beta-hydroxy) propyl ether of 2,4-dihydroxybenzophenone.

EXAMPLE V

This example illustrates the preparation of the 4-(ethyl citraconyloxy beta-hydroxy)propyl ether of 2,4-dihydroxybenzophenone, i.e.

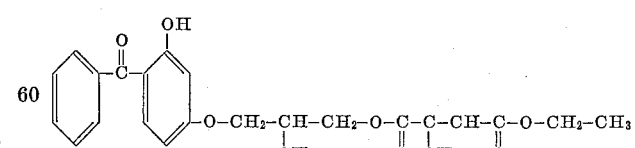

by means of the process of our invention.

An agitated mixture of 23.0 parts of glycidyl ethyl citraconate, 21.4 parts of 2,4-dihydroxybenzophenone and 0.4 part of sodium hydroxide was heated to a temperature in the range of 90° C. and maintained at this temperature for a period of 12 hours. Upon being cooled to 20° C., the resulting reaction product, which was in the form of a viscous oil, was removed and subjected to a base titration. The latter analysis revealed that there was about 2.5% of unreacted 2,4-dihydroxybenzophenone present within this reaction product which thereby indicated a conversion of 95% or a yield of about 40.7 parts of the 4-(ethyl citraconyloxy beta-hydroxy)propyl ether of 2,4-dihydroxybenzophenone.

EXAMPLE VI

This example illustrates the preparation of one of the novel copolymers of our invention by means of an aqueous emulsion polymerization technique and also demonstrates the improved resistance of the resulting copolymer to the degradative effects of ultra-violet radiation.

An aqueous latex of a 90:10:1 vinylidene chloride:ethyl acrylate:4-(itaconyloxy beta-hydroxy)propyl ether of 2,4-dihydroxybenzophenone terpolymer was prepared by charging the following ingredients into a reactor equipped with a reflux condenser as well as with means for mechanical agitation.

| | Parts |
|---|---|
| Vinylidene chloride | 90.0 |
| Ethyl acrylate | 10.0 |
| The 4-(itaconyloxy beta-hydroxy)propyl ether of 2,4-dihydroxybenzophenone | 1.0 |
| Sodium lauryl sulfate | 1.5 |
| Sodium dodecyl benzene sulfonate | 2.0 |
| Sodium bicarbonate | 0.3 |
| Sodium bisulfite | 0.2 |
| Ammonium persulfate | 0.25 |
| Water | 100.0 |

The above mixture was then refluxed at 33–35° C. for a period of 5 hours thereby resulting in a latex with a resin solids content of 50%, by weight, and an intrinsic viscosity, as determined in tetrahydrofuran at 30° C. of 0.82.

This latex was then used in the preparation of films, having a wet thickness of 3.0 mils, which were cast upon sheets of white paper. Various samples of these coated sheets were then exposed to 14 hours of direct sunlight. As a control for these tests, similarly coated sheets were exposed under the identical conditions; however, the coatings of these control sheets were derived from a 90:10 vinylidene chloride:ethyl acrylate copolymer latex made with a recipe which was identical to that described above but which did not contain the benzophenone monomer.

The effect of the direct sunlight upon these resin films was determined, with respect to any color change which had occurred, by utilizing a Photovolt Reflectometer, Model #610; a device which records proportionately higher readings with the increased yellowing of the particular coatings being evaluated. The following table presents the results of these tests. In this table, the reflectometer readings which are given represent the difference between the readings obtained from the freshly prepared coatings as against the readings obtained subsequent to their exposure to the light source. Thus, a higher degree of discoloration will, of course, be indicated by a higher reading.

| Number | Coating Resin | Reflectometer Reading |
|---|---|---|
| Control | 90:10 vinylidene chloride:ethyl acrylate | 24.0 |
| 1 | 90:10:1 vinylidene chloride:ethyl acrylate:4-(itaconyloxy beta-hydroxy)propyl ether of 2,4-dihydroxybenzophenone. | 2.0 |

The above data serve to indicate that the novel copolymers of our invention are far superior in their resistance to the effects of ultraviolet radiation as compared with comparable polymers which do not contain the ultraviolet absorbing benzophenone moiety.

EXAMPLE VII

This example illustrates the preparation of another of our novel copolymers by means of a solution polymerization technique.

A toluene lacquer of a 100:1 styrene:4-(methyl maleyloxy beta-hydroxy)propyl ether of 2,4-dihydroxybenzophenone copolymer was prepared by charging the following ingredients into a reactor equipped with a reflux condenser as well as with means for mechanical agitation.

| | Parts |
|---|---|
| Styrene | 100.0 |
| The 4-(methyl maleyloxy beta-hydroxy)propyl ether of 2,4-dihydroxybenzophenone | 1.0 |
| Tertiary butyl hydroperoxide | 0.5 |
| Toluene | 150.0 |

Under agitation, the above mixture was then refluxed at 110° C. for a period of 6 hours whereupon it was allowed to cool and discharged from the reactor. The resulting lacquer had a resin solids content of 37.5%, by weight, indicating a conversion of 94%. Films derived from this lacquer demonstrated greatly improved resistance to the degradative effects of ultraviolet radiation after prolonged outdoor exposure in contrast to comparable films derived from a similarly prepared styrene homopolymer lacquer.

EXAMPLE VIII

This example again illustrates the preparation of one of the novel copolymers of our invention by means of an aqueous emulsion polymerization technique and also demonstrates the improved resistance of the resulting copolymer to the degradative effects of ultra-violet radiation.

An aqueous latex of a 55:45:1 vinyl chloride:dibutyl maleate:4-(n-butyl maleyloxy beta-hydroxy)propyl ether of 2,4-dihydroxybenzophenone terpolymer was prepared by charging the following ingredients into a pressurized reactor.

| | Parts |
|---|---|
| Vinyl chloride | 55.0 |
| Dibutyl maleate | 45.0 |
| The 4-(n-butyl maleyloxy beta-hydroxy)propyl ether of 2,4-dihydroxybenzophenone | 1.0 |
| Octyl phenoxy polyoxyethylene ethanol | 7.5 |
| Sodium lauryl sulfate | 2.0 |
| Ammonium persulfate | 0.4 |
| Water | 168.0 |

The above mixture was then maintained at a temperature of 70° C. for a period of 8 hours resulting in a latex which had a resin solids content of 37.1%, by weight, and an intrinsic viscosity, as determined in tetrahydrofuran at 30° C., of 0.70.

This latex was then used in the preparation of films having a wet thickness of 3.0 mils which were cast upon glass plates. Various samples of these coated plates were then exposed to the equivalent of 5 months of continuous sunlight by being placed at a distance of 2 feet from a mercury vapor photochemical lamp which was enclosed, together with the coated plates, in a ventilated, light-proof cabinet for a period of 5 days. As a control for these tests, similarly coated plates were exposed under identical conditions; however, the coatings of these controls were derived from a 55:45 vinyl chloride:dibutyl maleate copolymer latex made with a recipe which was identical to that described above but which did not contain the benzophenone monomer.

In evaluating the results of these tests, it was noted that the films derived from the novel terpolymer of our invention demonstrated greatly improved resistance to the degradative effects of ultra-violet radiation inasmuch as they successfully retained their flexibility and clarity whereas the control films became extremely brittle, discolored, and tended to crumble upon being handled.

EXAMPLE IX

This example again illustrates the preparation of one of the novel copolymers of our invention by means of an aqueous emulsion polymerization technique and also demonstrates the improved resistance of the resulting copolymer to the degradative effects of ultra-violet radiation.

An aqueous latex of a 100:29:1 vinyl acetate:dibutyl maleate:4-(crotonyloxy beta-hydroxy)propyl ether of 2,4-dihydroxybenzophenone terpolymer was prepared by charging the following ingredients into a reactor equipped with a reflux condenser as well as with means for mechanical agitation.

| | Parts |
|---|---|
| Vinyl acetate | 100.0 |
| Dibutyl maleate | 29.0 |
| The 4-(crotonyloxy beta-hydroxy)propyl ether of 2,4-dihydroxybenzophenone | 1.0 |
| Polyvinyl alcohol (87% hydrolyzed, medium viscosity grade) | 3.0 |
| Ammonium persulfate | 0.5 |
| Water | 100.0 |

The above mixture was then maintained at a temperature of 94° C. for a period of 8 hours resulting in a latex which had a resin solids content of 49.3%, by weight, and an intrinsic viscosity, as determined in acetone at 30° C., of 0.54.

This latex was then used in the preparation of films having a wet thickness of 3.0 mils which were cast upon glass plates. Various samples of these coated plates were then exposed to direct sunlight for a period 3 months. As a control for these tests, similarly coated plates were exposed under identical conditions; however, the coatings of these control sheets were derived from a 100:29 vinyl acetate:dibutyl maleate copolymer latex made with a recipe which was identical to that described above but which did not contain the benzophenone monomer.

In evaluating the results of these tests, it was noted that the films derived from the novel terpolymer of our invention demonstrated greatly improved resistance to the degradative effects of ultra-violet radiation inasmuch as they successfully retained their flexibility and could be removed intact from the glass plates upon which they had been cast whereas the control films became extremely brittle and crumbled upon being removed from their glass plates.

Summarizing, our invention is thus seen to provide a novel class of ethylenically unsaturated benzophenone derivatives which may be incorporated into a wide variety of copolymers which are characterized by their outstanding resistance to the degradative effects of ultra-violet radiation. Variations may be made in proportions, procedures and materials without departing from the scope of this invention as defined by the following claims.

What is claimed is:

1. The ethylenically unsaturated derivative of 2,4-dihydroxybenzophenone having a formula corresponding to the following representation:

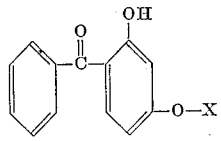

wherein X is an ethylenically unsaturated radical selected from among the group consisting of the beta-hydroxypropylene crotonate, beta-hydroxypropylene alkyl maleate, beta-hydroxypropylene alkyl fumarate, beta-hydroxypropylene alkyl itaconate, and beta-hydroxypropylene alkyl citraconate radicals which are linked to the oxy radical which is substituted on the 4 position of the benzophenone nucleus via their respective beta-hydroxypropylene moieties.

2. The ethylenically unsaturated derivative of claim 1 wherein the alkyl radicals of said beta-hydroxypropylene alkyl maleate, beta-hydroxypropylene alkyl fumarate, beta-hydroxypropylene alkyl itaconate, and beta-hydroxypropylene alkyl citraconate radicals are alkyl radicals containing no more than 4 carbon atoms selected from among the group consisting of methyl, ethyl, n-propyl, isopropyl, n-butyl, isobutyl, secondary butyl, and tertiary butyl radicals.

3. The ethylenically unsaturated derivative of 2,4-dihydroxybenzophenone selected from the group consisting of:
the 4-(crotonyloxy beta-hydroxy)propyl ether of 2,4-dihydroxybenzophenone;
the 4-($C_1$-$C_4$ alkyl maleyloxy beta-hydroxy)propyl ether of 2,4-dihydroxybenzophenone;
the 4-($C_1$-$C_4$ alkyl fumaryloxy beta-hydroxy)propyl ether of 2,4-dihydroxybenzophenone;
the 4-($C_1$-$C_4$ alkyl itaconyloxy beta-hydroxy)propyl ether of 2,4-dihydroxybenzophenone; and,
the 4-($C_1$-$C_4$ alkyl citraconyloxy beta-hydroxy)propyl ether of 2,4-dihydroxybenzophenone.

4. The 4-(crotonyloxy beta-hydroxy)propyl ether of 2,4-dihydroxybenzophenone.

5. The 4-($C_1$-$C_4$ alkyl maleyloxy beta-hydroxy)propyl ether of 2,4-dihydroxybenzophenone.

6. The 4-($C_1$-$C_4$ alkyl fumaryloxy beta-hydroxy)propyl ether of 2,4-dihydroxybenzophenone.

7. The 4-($C_1$-$C_4$ alkyl itaconyloxy beta-hydroxy)propyl ether of 2,4-dihydroxybenzophenone.

8. The 4-($C_1$-$C_4$ alkyl citraconyloxy beta-hydroxy)propyl ether of 2,4-dihydroxybenzophenone.

9. A composition comprising a polymer of at least one ethylenically unsaturated monomer together with at least one ethylenically unsaturated 2,4-dihydroxybenzophenone derivative having a formula corresponding to the following representation:

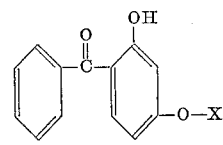

wherein X is an ethylenically unsaturated radical selected from among the group consisting of the beta-hydroxypropylene crotonate, beta-hydroxypropylene $C_1$-$C_4$ alkyl maleate, beta-hydroxypropylene $C_1$-$C_4$ alkyl fumarate, beta-hydroxypropylene $C_1$-$C_4$ alkyl itaconate, and beta-hydroxypropylene $C_1$-$C_4$ alkyl citraconate radicals.

10. The composition of claim 9, wherein said ethylenically unsaturated 2,4-dihydroxybenzophenone derivative is selected from among the group consisting of:
the 4-(crotonyloxy beta-hydroxy)propyl ether of 2,4-dihydroxybenzophenone;
the 4-($C_1$-$C_4$ alkyl maleyloxy beta-hydroxy)propyl ether of 2,4-dihydroxybenzophenone;
the 4-($C_1$-$C_4$ alkyl fumaryloxy beta-hydroxy)propyl ether of 2,4-dihydroxybenzophenone;
the 4-($C_1$-$C_4$ alkyl itaconyloxy beta-hydroxy)propyl ether of 2,4-dihydroxybenzophenone; and,
the 4-($C_1$-$C_4$ alkyl citraconyloxy beta-hydroxy)propyl ether of 2,4-dihydroxybenzophenone.

11. The composition of claim 9, wherein said ethylenically unsaturated monomer is selected from among the group consisting of styrene, alpha-methyl styrene, the acrylic and methacrylic esters of aliphatic alcohols, acrylic acid, methacrylic acid, acrylamide, acrylonitrile, methacrylonitrile, butadiene, vinyl propionate, dibutyl maleate, dibutyl fumarate, vinylidene chloride, vinyl chloride, vinyl acetate, ethylene, and propylene.

12. The composition of claim 9, wherein said ethylenically unsaturated 2,4-dihydroxybenzophenone moiety is present in a proportion of at least 0.1% by weight.

13. A composition in accordance with claim 12, in which vinylidene chloride and ethyl acrylate are polymerized with the 4-(itaconyloxy beta-hydroxy)propyl ether of 2,4-dihydroxybenzophenone.

14. A composition in accordance with claim 12, in which styrene is polymerized with the 4-(methyl maleyloxy beta-hydroxy)propyl ether of 2,4-dihydroxybenzophenone.

15. A composition in accordance with claim 12, in which vinyl chloride and dibutyl maleate are polymerized with the 4-(n-butyl maleyloxy beta-hydroxy)propyl ether of 2,4-dihydroxybenzophenone.

16. A composition in accordance with claim 12, in which vinyl acetate and dibutyl maleate are polymerized with the 4-crotonyloxy beta-hydroxy)propyl ether of 2,4-dihydroxybenzophenone.

References Cited

UNITED STATES PATENTS

| | | | |
|---|---|---|---|
| 3,133,042 | 5/1964 | Tocker | 260—47 |
| 3,162,676 | 12/1964 | Goldberg | 260—486 |

FOREIGN PATENTS 605,542  6/1960  Italy.

OTHER REFERENCES

Wagner: Synthetic Organic Chemistry, pp. 233–234 (1953), Lab. Call No. QD 262 W24.

WILLIAM H. SHORT, *Primary Examiner.*

L. P. QUAST, *Assistant Examiner.*